United States Patent

Salina et al.

[11] Patent Number: 6,023,143
[45] Date of Patent: Feb. 8, 2000

[54] MIXED PWM/LINEAR MODE DRIVING SYSTEM EMPLOYING TWO DISTINCT OUTPUT POWER STAGES

[75] Inventors: Alberto Salina, Limbiate; Donatella Brambilla, Mariano Comense, both of Italy

[73] Assignee: STMicroelectronics S.r.l.

[21] Appl. No.: 09/109,022

[22] Filed: Jul. 1, 1998

[30] Foreign Application Priority Data

Jul. 16, 1997 [IT] Italy .................................. VA97A0025

[51] Int. Cl.[7] ........................................................ H02P 7/00
[52] U.S. Cl. ........................... 318/599; 318/560; 318/254; 318/439
[58] Field of Search ..................... 318/138, 139, 318/245, 254, 439, 590, 599, 591, 611, 603; 363/98, 131, 41; 360/77.08, 46, 67–68, 51, 77.05, 78.12, 75, 77.02; 369/50, 54, 58, 47, 44.29, 44.35, 44.27, 32; 371/37.1, 47.1, 37.5; 395/438, 310, 404

[56] References Cited

U.S. PATENT DOCUMENTS

| | | | |
|---|---|---|---|
| 4,006,391 | 2/1977 | Deering et al. | 318/599 |
| 5,241,546 | 8/1993 | Peterson et al. | 371/37.1 |
| 5,255,136 | 10/1993 | Machado et al. | 360/77.02 |
| 5,517,631 | 5/1996 | Machado et al. | 395/438 |
| 5,553,086 | 9/1996 | Sompel et al. | 371/47.1 |
| 5,666,035 | 9/1997 | Basire et al. | 318/254 |
| 5,689,483 | 11/1997 | Ikeda | 369/32 |
| 5,715,218 | 2/1998 | Ikeda | 369/44.29 |
| 5,723,963 | 3/1998 | Li et al. | 318/590 |
| 5,724,328 | 3/1998 | Yanagi | 369/50 |
| 5,731,670 | 3/1998 | Galbiati et al. | 318/254 |
| 5,838,515 | 11/1998 | Mortazavi et al. | 360/78.12 |
| 5,910,861 | 6/1999 | Ahn | 360/46 |
| 5,917,720 | 6/1999 | Galbiati | 363/98 |

*Primary Examiner*—Paul Ip
*Attorney, Agent, or Firm*—Allen, Dyer, Doppelt, Milbrath & Gilchrist, P.A.

[57] ABSTRACT

A mixed mode PWM/Linear driving system for at least one inductive-resistive (L-R) actuator as a function of operating conditions thereof includes a first full bridge power stage including four power switching devices arranged in pairs for being driven in phase opposition. The system also includes a pulse width modulation (PWM) converter for producing a PWM signal directly driving the first full bridge power stage during a PWM mode operating phase. A second full bridge power stage also comprises four power switching devices of different electrical characteristics from the power switching devices of the first full bridge power stage. The system further includes a pair of amplifiers connected to respective pairs of power switching devices of the second full bridge power stage for driving same in phase opposition during a linear mode operating phase. A switch is provided for switching between the PWM mode operating phase and the linear mode operating phase.

24 Claims, 6 Drawing Sheets

MIXED PWM/LINEAR MODE DRIVING SYSTEM EMPLOYING TWO DISTINCT OUTPUT POWER STAGES

FIELD OF THE INVENTION

The present invention relates to driving systems for an inductive-resistive (L-R) actuator through a full bridge power stage in a PWM or in a linear mode depending on the operating conditions. More particularly, the invention relates to such a driving system for a so-called voice coil motor used in hard disk drives and similar mass memory devices.

BACKGROUND OF THE INVENTION

In many positioning and driving systems for rotating mass memory devices, such as, for example, in hard disk (HD) and floppy disk (FD) drives, the L-R actuator, in these cases the motor, requires a peak current to speed up to a high speed during a first phase of the routine to find the right track. Such a driving system also typically requires a relatively low and controlled current during a successive tracking phase for precisely maintaining the position during the reading or the writing of data from and to the recordable media.

A typical driving system for a rotating mass memory media (hard disk drives, floppy disk drives, etc.) is depicted in FIG. 1. This figure shows how the driving current of a so-called voice coil motor (VCM) used in an HD drive is relatively high during a first phase A when the motor is forced to reach a relatively high speed in the shortest possible time. The figure also shows the driving current during phase B, when a reverse current, also relatively high, flows into the motor to initiate a braking action.

In a successive phase C, the current drops progressively when the motor approaches and reaches a constant speed. This permits a precise tracking during which the reading or writing operations take place. The last part of phase C is often referred to as the tracking phase when the write and read operations occur. In contrast, phases A and B and the first part (approach) of phase C define the so-called seeking phase, during which a high dissipation occurs.

The general requirement of reducing current consumption imposes the use of power devices with a low conduction resistance. This, according to state of the art integration techniques, implies the use of n-channel DMOS transistors, and the implementation of a pulse width modulation (PWM) driving of a full bridge power stage. The full bridge power stage is typically realized with four of the n-channel DMOS transistors.

Nevertheless, in many applications such as the one mentioned above where there is a tracking phase requiring a relatively low current though controlled with a high precision, the PWM driving cannot ensure an equivalent precision as that obtainable with a linear driving with operational amplifiers. On the other hand, the linear driving of an L-R actuator, for example a VCM motor, using a pair of operational amplifiers functioning in phase opposition according to a scheme as shown in FIG. 2 ensures a high precision, but is unfortunately penalized in terms of an increased power dissipation.

Approaches have been proposed for improving the performance of the driving system during the seeking and tracking phases to reduce consumption. To overcome the drawbacks of a linear mode driving system though preserving an acceptable tracking precision, a system has been proposed that would automatically switch from a PWM mode, employed during a first search phase to a linear mode used during the tracking phase, according to the scheme illustrated in FIG. 3. The two half-bridges that comprise the full bridge stage are driven by respective operational amplifiers. The inputs of the amplifiers receive a PWM signal generated by the respective converter or the error signal produced by the respective error amplifier of the driving system.

The disadvantage of such a system is the limited bandwidth when functioning in the linear mode, because of the presence of the power transistors (Md1, Md2, Md3 and Md4) that form the full bridge stage. The transistor dimensions and resulting electrical parameters are commensurate to support the relatively high current levels as required during the seeking phase. This limited bandwidth of the full bridge stage tends to excessively reduce the bandwidth of a linear control loop of the VCM motor during the critical tracking phase.

To appreciate the limitations and drawbacks of the above described system, it will be helpful to consider the response characteristic of the open loop system in a linear functioning mode and its peculiarities. FIG. 4 shows the open loop response of a driving system of a VCM motor, such as the one depicted in FIGS. 2 and 3 (in the latter case when functioning in a linear mode). The characteristic reproduced in FIG. 4 highlights the following aspects:

the presence of a dominant pole (Pd) that is inversely proportional to the product of the compensation capacitance (Ce), and the gain of the error operational amplifier and by the feedback resistance (Rf) of the current sensing operational amplifer;

the presence of a second pole (P2) due to the inductance of the motor which tends to make the loop unstable; and the presence of a zero (Z) introduced to compensate the second pole, by dimensioning the capacitance (Ce) and resistance (Re) values of the compensation network of the error amplifier.

For instance, in a typical VCM motor of a hard disk drive, the pole introduced by the motor may be about 1 Khz. By dimensioning the values of the components of the compensation network of the error operational amplifer, the compensation zero may be fixed to a position just below the frequency of the motor pole. The value of the compensation capacitor may be established so as to fix the dominant pole of the loop to guarantee a phase margin of about 60°. The gain bandwidth product (GBWP) of the error operational amplifier is the determinant factor that most influences the GBWP of the whole regulation loop.

To avoid a limitation of the regulation loop bandwidth, it is necessary to use driving operational amplifers, in cascade with the error amplifier, with a GBWP product of at least two orders of magnitude above the GBWP target value of the whole regulation loop. In other words, to obtain a sufficiently large bandwidth of the regulation loop, the bandwidth of the driving operational amplifers must be larger than that of the error amplifier. Therefore, the transfer function of the error amplifier may be multiplied by the gain without an attendant reduction of the phase margin. Indeed, to ensure a regulation loop GBWP of about 30 Khz, driving operational amplifers with a GBWP of about 3 Mhz, are needed. However, having to drive relatively large transistors with a small Rdson having relatively large intrinsic capacitances, the driving operational amplifiers must be adequately compensated, and this significantly limits their GBWP.

SUMMARY OF THE INVENTION

An object of the invention is to provide a mixed PWM/Linear driving system without the disadvantages and limitations of known circuits.

A further object of the invention is to provide a driving system with an enhanced bandwidth of the regulation loop when operating in a linear mode, while optimizing power dissipation of the system.

These objects and associated advantages are attained by the system of the present invention that includes two distinct full bridge power stages, substantially operating in parallel. A first full bridge stage operates during operation in a PWM mode and is provided by four power devices whose dimensions are adequate to withstand the design peak current, and have a low internal resistance in conduction. The second full bridge stage operates during operation in a linear mode and is composed of four P or N type devices with electrical characteristics that are substantially different from those of the four power devices that compose the first stage, because the second full bridge stage need only function with relatively low current levels.

The first stage is active during PWM functioning phases. The four power devices that provide the first stage are preferably N-channel DMOS transistors that are directly driven by the PWM signal produced by the respective PWM converter and by the inverted signal thereof. In contrast, the second full bridge stage is driven by two operational amplifiers functioning in phase opposition, at the inputs of which is applied the error signal produced by the associated error amplifier. Each of the two half-bridges that provide the full bridge stage preferably comprise a complementary pair of MOS transistors connected in a common source configuration.

The system switches the error signal produced by the error operational amplifier on either the input of the PWM converter circuit or on the respective input, inverting and noninverting, of the two operational amplifiers that drive the respective half-bridges of the second full bridge stage. Accordingly, the sensing resistor of the current crossing the L-R actuator may be shared by the two parallel full bridges.

According to an alternative embodiment of the invention the L-R actuator is duplicated in the sense that the first full bridge power output stage, operative during a PWM driving phase, drives a first L-R actuator while the second full bridge power output stage, operative during a linear driving phase, drives a second L-R microactuator of fractional power compared with the power of the first or main actuator. The second microactuator cooperates with the main actuator for the correct positioning of the element controlled by the system. According to this alternative embodiment, each of the two actuators has its own current sensing resistor in series therewith, and the PWM/Linear mode switching devices also provide for the switching of either one or the other of the two current sensing resistors to the respective inputs of the current sensing amplifier.

The system of the invention optimizes the current consumption while ensuring the highest performance in terms of speed and precision.

DETAILED DESCRIPTION OF THE PREFERRED EMBODIMENTS

All the driving systems shown in the figures refer to the case of driving a voice coil motor (VCM), which is by far, the most used in hard disk and floppy disks drives, and the like. Nevertheless the invention is not to be understood as exclusively limited to these applications. Generally, in these driving systems, the SENSE AMPLIFIER receives as an input the voltage present at the terminals of the current sense resistor R_SENSE and transfers it to the reference voltage DACO, with a gain that may be unitary.

The error operational amplifier compares the reference voltage fixed by the DACO with the voltage on the SUMIN node. This node is where the currents VDAC/Rin1 and VCMSNS/Rf should be balanced. The current difference is converted to a voltage by the filter placed at the terminals of the ERROR AMPLIFIER.

Figure 5:
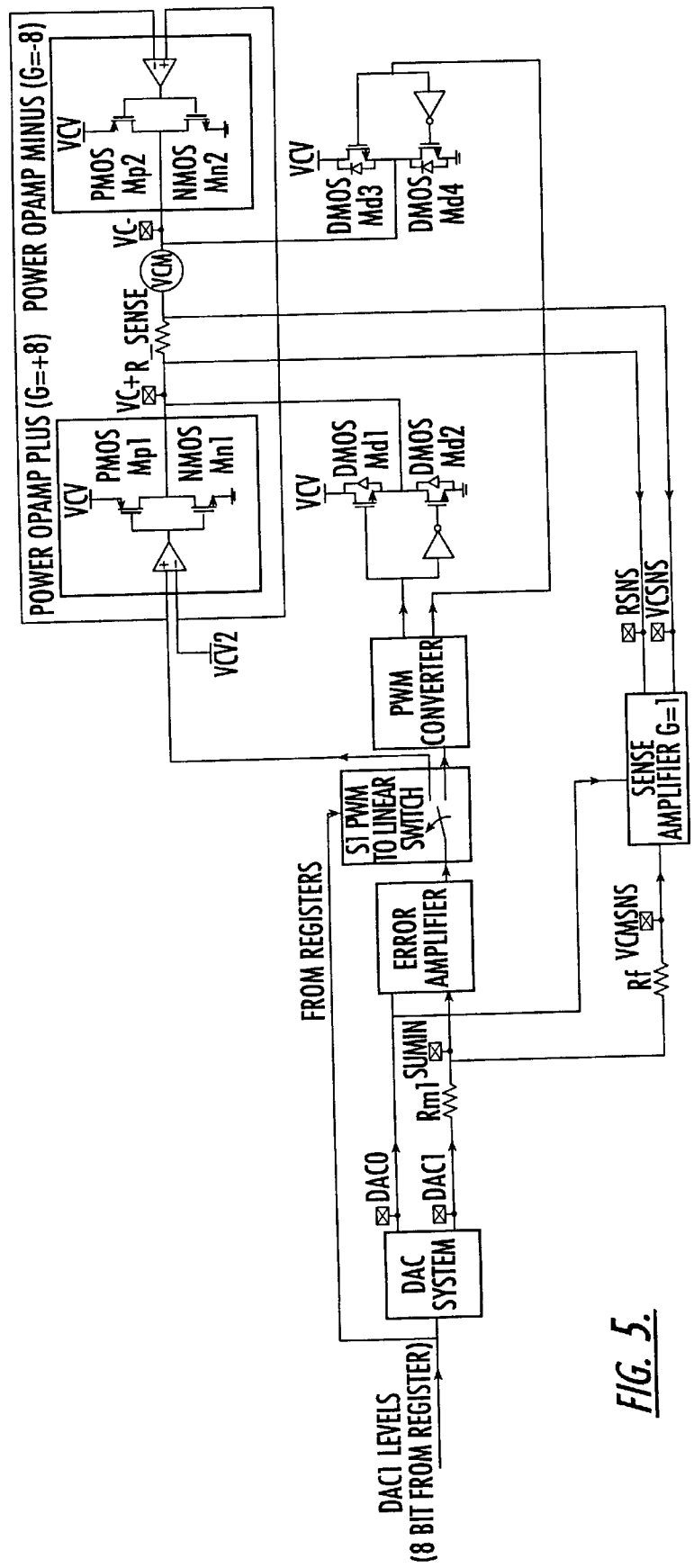
FIG. 5 is a block diagram of a mixed mode VCM driving system, according to the present invention.

Upon referring to the scheme of FIG. 5, depicting a first embodiment of the invention, when the system operates in a PWM mode, the error signal produced by the ERROR AMPLIFIER is switched by the S1 block onto the input of the PWM CONVERTER. The produced signal and its inverse are used to drive the two half-bridge circuits, respectively, of the full bridge power stage, provided by the four DMOS transistors: Md1, Md2, Md3, Md4, by using an inverter to drive the pull-down device (Md2 and Md4) of each half-bridge.

When the system commands a transition from a PWM mode to a linear mode, the block S1 switches the error signal on the noninverting input and on the inverting input of the pair of operational amplifiers: POWER OPAMP PLUS and POWER OPAMP MINUS, respectively. These drive the two half-bridges that define the second auxiliary full bridge stage, which are formed by the complementary pairs of MOS transistors: Mp1-Mn1 and Mp2-Mn2, respectively.

The second full bridge stage is realized with relatively small size power transistors having parasitic capacitances proportionally lower that the parasitic capacitances of the much larger LDMOS power transistors that provide the first or main full bridge power stage. This preserves a high GBWP product of the driving amplifiers and permits fixing the dominant pole using a relatively small compensation capacitance Ce for the error amplifier, thus preserving a phase margin of about 60°. In practice, in a typical application such as that of driving a VCM motor of a hard disk drive, the system of the invention of FIG. 5 makes it possible to ensure a GBWP of 20 Khz (during a phase of linear functioning).

Figure 6:
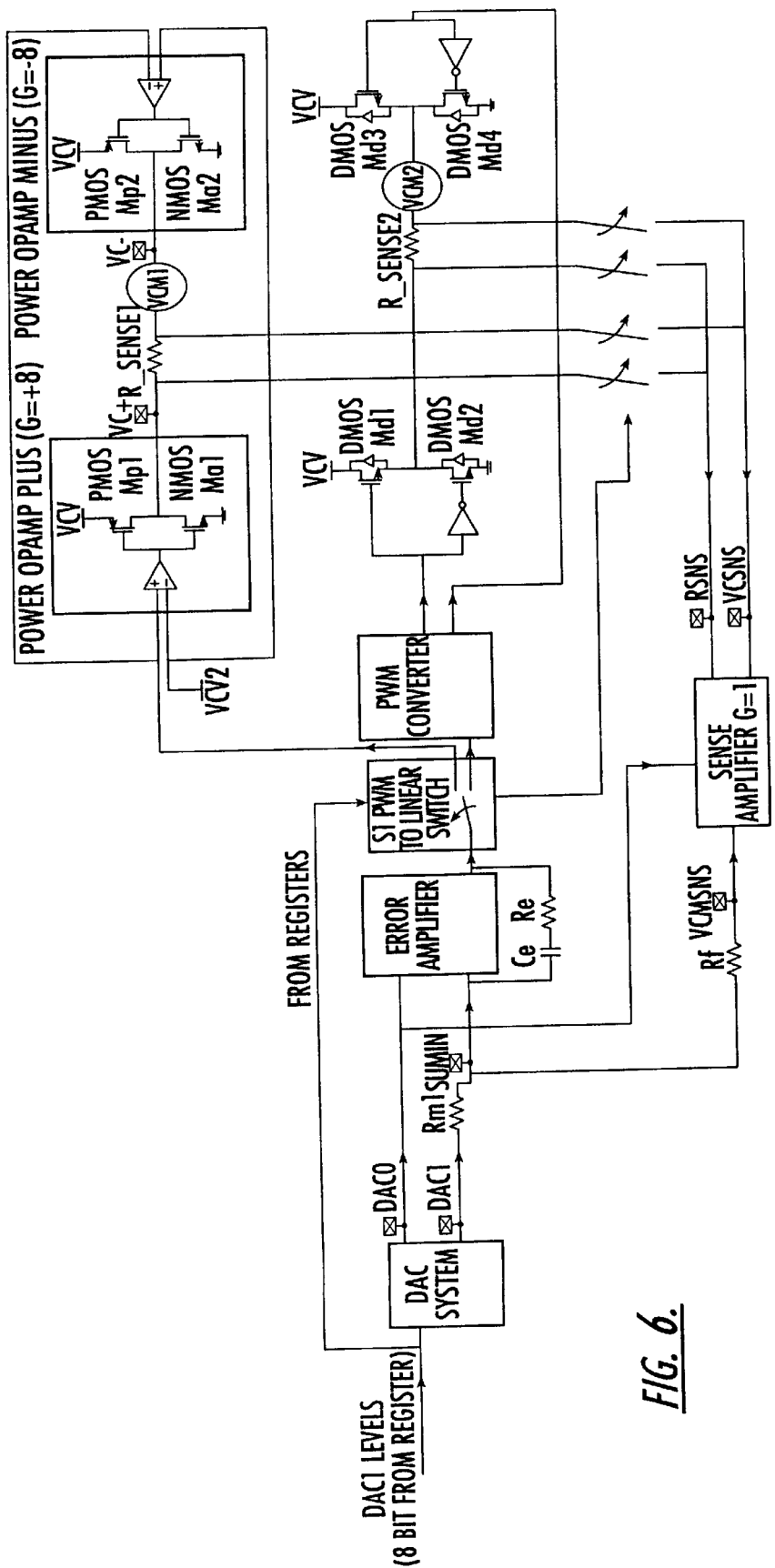
FIG. 6 is a block diagram of a driving system according to an alternative embodiment of the invention.

According to the alternative embodiment of the invention shown in FIG. 6, the actuator or in other words the VCM motor, is also duplicated. A first VCM motor of adequate power VCM2 is driven in a PWM mode by a first full bridge power stage provided by the four DMOS transistors Md1, Md2, Md3 and Md4, while a microactuator or micro-VCM (VCM1), of a power that is just a fraction of the power of the main VCM2, is driven in a linear mode by a dedicated second auxiliary full bridge stage provided by two pairs of complementary MOS transistors: Mp1—Mn1 and Mp2—Mn2.

According to this embodiment, each VCM is connected in series to its own current sensing resistor: R_SENSE1 and R_SENSE2, and the signal present on either one or the other of the two resistors is operatively switched to the inputs of the current sensing amplifier SENSE AMPLIFIER, by the same command for the switching of the functioning mode, coming from the S1 block.

We claim:

1. A mixed mode PWM/Linear driving system for at least one inductive-resistive (L-R) actuator as a function of operating conditions thereof, the driving system comprising:

a first full bridge power stage including four power switching devices arranged in pairs for being driven in phase opposition, the four power switching devices having a relatively low internal resistance and high current carrying capacity;

at least one current sensor for being connected to the at least one L-R actuator;

a first error amplifier having an input connected to said at least one current sensor and having an output producing an error signal;

a pulse width modulation (PWM) converter connected to the output of said first error amplifier for producing a PWM signal directly driving the first full bridge power stage during a PWM mode operating phase;

a second full bridge power stage comprising four power switching devices of different electrical characteristics from the power switching devices of said first full bridge power stage;

a pair of operational amplifiers connected to respective pairs of power switching devices of said second full bridge power stage for driving same in phase opposition during a linear mode operating phase; and switching means for switching between the PWM mode operating phase and the linear mode operating phase.

2. A system according to claim 1, wherein the current sensor comprises a current sensing resistor and an amplifier connected thereto.

3. A sysem according to claim 2, wherein said first and second full bridge power stages share the same current sensing resistor.

4. A system according to claim 1, wherein said first full bridge power stage comprises four N-channel DMOS power transistors.

5. A system according to claim 1, wherein said second full bridge power stage comprises two-complementary pairs of MOS transistors connected in a common source configuration.

6. A system according to claim 1, wherein outputs of said first and second full bridge power stages are connected in parallel to drive a same L-R actuator.

7. A system according to claim 1, wherein outputs of said first and second full bridge power stages are connected so that the first full bridge power stage drives a first L-R actuator while said second full bridge power stage drives a second L-R actuator of fractional power compared to a power of the first L-R actuator.

8. A mixed mode PWM/Linear driving system for at least one inductive-resistive (L-R) actuator as a function of operating conditions thereof, the driving system comprising:

a first full bridge power stage including four power switching devices arranged in pairs for being driven in phase opposition;

a pulse width modulation (PWM) converter for producing a PWM signal directly driving the first full bridge power stage during a PWM mode operating phase;

a second full bridge power stage comprising four power switching devices of different electrical characteristics from the power switching devices of said first full bridge power stage;

a pair of amplifiers connected to respective pairs of power switching devices of said second full bridge power stage for driving same in phase opposition during a linear mode operating phase; and a switch for switching between the PWM mode operating phase and the linear mode operating phase.

9. A system according to claim 8, further comprising:

a current sensing resistor and associated amplifier connected to the at least one L-R actuator; and an error amplifier connected to said current sensing resistor and associated amplifier for generating an error signal coupled to said PWM converter.

10. A system according to claim 9, wherein said first and second full bridge power stages share the same current sensing resistor.

11. A system according to claim 8, wherein said first full bridge power stage comprises four N-channel DMOS power transistors.

12. A system according to claim 8, wherein said second full bridge power stage comprises two complementary pairs of MOS transistors connected in a common source configuration.

13. A system according to claim 8, wherein outputs of said first and second full bridge power stages are connected in parallel to drive a same L-R actuator.

14. A system according to claim 8, wherein outputs of said first and second full bridge power stages are connected so that the first full bridge power stage drives a first L-R actuator while said second full bridge power stage drives a second L-R actuator of fractional power compared to a power of the first L-R actuator.

15. A memory storage device comprising:

at least one voice coil motor; and a mixed mode PWM/Linear driving system for said at least one voice coil motor as a function of operating conditions thereof, the driving system comprising a first full bridge power stage including four power switching devices arranged in pairs for being driven in phase opposition, a pulse width modulation (PWM) converter for producing a PWM signal directly driving the first full bridge power stage during a PWM mode operating phase, a second full bridge power stage comprising four power switching devices of different electrical characteristics from the power switching devices of said first full bridge power stage, a pair of amplifiers connected to respective pairs of power switching devices of said second full bridge power stage for driving same in phase opposition during a linear mode operating phase, and a switch for switching between the PWM mode operating phase and the linear mode operating phase.

16. A memory storage device according to claim 15, further comprising:

a current sensing resistor and associated amplifier connected to the at least one voice coil motor; and an error amplifier connected to said current sensing resistor and associated amplifier for generating an error signal coupled to said PWM converter.

17. A memory storage device according to claim 16, wherein said first and second full bridge power stages share the same current sensing resistor.

18. A memory storage device according to claim 15, wherein said first full bridge power stage comprises four N-channel DMOS power transistors.

19. A memory storage device according to claim 15, wherein said second full bridge power stage comprises two complementary pairs of MOS transistors connected in a common source configuration.

20. A memory storage device according to claim 15, wherein outputs of said first and second full bridge power stages are connected in parallel to drive a same voice coil motor.

21. A memory storage system according to claim 15, wherein outputs of said first and second full bridge power stages are connected so that the first full bridge power stage drives a first voice coil motor while said second full bridge power stage drives a second voice coil motor of fractional power compared to a power of the first voice coil motor.

22. A method for driving at least one inductive-resistive (L-R) actuator as a function of operating conditions thereof using a circuit comprising a first full bridge power stage including four power switching devices arranged in pairs, a second full bridge power stage comprising four power switching devices of different electrical characteristics from the power switching devices of said first full bridge power stage, and a pair of amplifiers connected to respective pairs of power switching devices of said second full bridge power stage, the method comprising the steps of:

directly driving in phase opposition the pairs of power switching devices of the first full bridge power stage with a pulse width modulation (PWM) signal during a PWM mode operating phase;

using the pair of amplifiers for driving in phase opposition pairs of power switching devices of the second full bridge power stageduring a linear mode operating phase; and switching between the PWM mode operating phase and the linear mode operating phase.

23. A method according to claim 22, further comprising the step of connecting outputs of said first and second full bridge power stages in parallel to drive a same L-R actuator.

24. A method according to claim 22, further comprising the step of connecting outputs of said first and second full bridge power stages so that the first full bridge power stage drives a first L-R actuator while said second full bridge power stage drives a second L-R actuator of fractional power compared to a power of the first L-R actuator.

* * * * *

UNITED STATES PATENT AND TRADEMARK OFFICE
CERTIFICATE OF CORRECTION

PATENT NO. : 6,023,143
DATED : Feb. 8, 2000
INVENTOR(S) : Salina, et al

It is certified that error appears in the above-identified patent and that said Letters Patent is hereby corrected as shown below:

The title page, showing the illustrative figure, should be deleted to appear as per the attached title page.

The drawings sheets, consisting of Figs. 2, 3, 5 and 6, should be deleted to be replaced with the drawings sheets, consisting of Figs. 2, 3, 5 and 6, as shown on the attached pages.

Signed and Sealed this

First Day of May, 2001

Attest:

NICHOLAS P. GODICI

Attesting Officer

Acting Director of the United States Patent and Trademark Office

United States Patent
Salina et al.

[11] Patent Number: 6,023,143
[45] Date of Patent: Feb. 8, 2000

[54] MIXED PWM/LINEAR MODE DRIVING SYSTEM EMPLOYING TWO DISTINCT OUTPUT POWER STAGES

[75] Inventors: Alberto Salina, Limbiate; Donatella Brambilla, Mariano Comense, both of Italy

[73] Assignee: STMicroelectronics S.r.l.

[21] Appl. No.: 09/109,022

[22] Filed: Jul. 1, 1998

[30] Foreign Application Priority Data

Jul. 16, 1997 [IT] Italy ................ VA97A0025

[51] Int. Cl.[7] .................................................. H02P 7/00
[52] U.S. Cl. ........................ 318/599; 318/560; 318/254; 318/439
[58] Field of Search ......................... 318/138, 139, 318/245, 254, 439, 590, 599, 591, 611, 603; 363/98, 131, 41; 360/77.08, 46, 67–68, 51, 77.05, 78.12, 75, 77.02; 369/50, 54, 58, 47, 44.29, 44.35, 44.27, 32; 371/37.1, 47.1, 37.5; 395/438, 310, 404

[56] References Cited

U.S. PATENT DOCUMENTS

| | | | |
|---|---|---|---|
| 4,006,391 | 2/1977 | Deering et al. | 318/599 |
| 5,241,546 | 8/1993 | Peterson et al. | 371/37.1 |
| 5,255,136 | 10/1993 | Machado et al. | 360/77.02 |
| 5,517,631 | 5/1996 | Machado et al. | 395/438 |
| 5,553,086 | 9/1996 | Sompel et al. | 371/47.1 |
| 5,666,035 | 9/1997 | Basire et al. | 318/254 |
| 5,689,483 | 11/1997 | Ikeda | 369/32 |
| 5,715,218 | 2/1998 | Ikeda | 369/44.29 |
| 5,723,963 | 3/1998 | Li et al. | 318/590 |
| 5,724,328 | 3/1998 | Yanagi | 369/50 |
| 5,731,670 | 3/1998 | Galbiati et al. | 318/254 |
| 5,838,515 | 11/1998 | Mortazavi et al. | 360/78.12 |
| 5,910,861 | 6/1999 | Ahn | 360/46 |
| 5,917,720 | 6/1999 | Galbiati | 363/98 |

*Primary Examiner*—Paul Ip
*Attorney, Agent, or Firm*—Allen, Dyer, Doppelt, Milbrath & Gilchrist, P.A.

[57] ABSTRACT

A mixed mode PWM/Linear driving system for at least one inductive-resistive (L-R) actuator as a function of operating conditions thereof includes a first full bridge power stage including four power switching devices arranged in pairs for being driven in phase opposition. The system also includes a pulse width modulation (PWM) converter for producing a PWM signal directly driving the first full bridge power stage during a PWM mode operating phase. A second full bridge power stage also comprises four power switching devices of different electrical characteristics from the power switching devices of the first full bridge power stage. The system further includes a pair of amplifiers connected to respective pairs of power switching devices of the second full bridge power stage for driving same in phase opposition during a linear mode operating phase. A switch is provided for switching between the PWM mode operating phase and the linear mode operating phase.

24 Claims, 6 Drawing Sheets

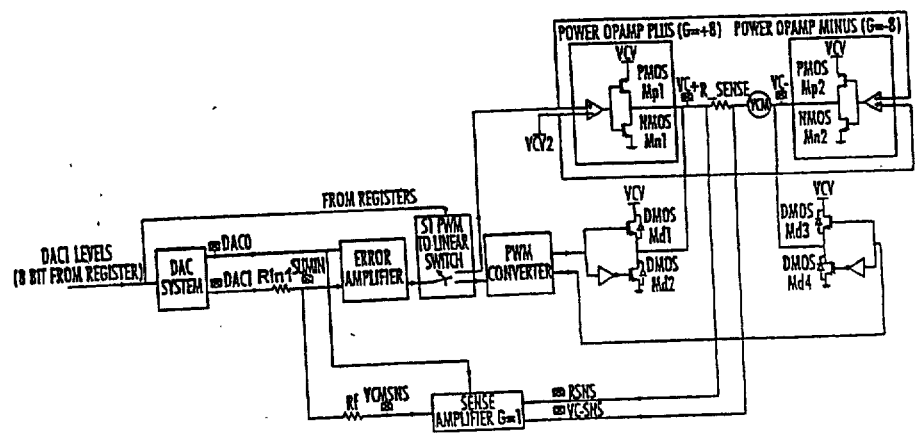

UNITED STATES PATENT AND TRADEMARK OFFICE
CERTIFICATE OF CORRECTION

Page 3 of 7

PATENT NO. : 6,023,143
DATED : February 8, 2000
INVENTOR(S) : Salina et al.

It is certified that error appears in the above-identified patent and that said Letters Patent is hereby corrected as shown below:

| | |
|---|---|
| {75} Inventors: Line 2 | Insert - -Perticato di- - before "Mariano Comense" |
| {73} Assignee: Line 2 | Insert - -Agrate Brianza, Italy- - after STMicroelectronics, S.r.l. |
| Column 2, Line 27 | Strike "amplifer"<br>Insert - -amplifier- - |
| Column 2, Line 29 | Strike "amplifer"<br>Insert - -amplifier- - |
| Column 2, Line 39 | Strike "amplifer"<br>Insert - -amplifier- - |
| Column 2, Line 47 | Strike "amplifer"<br>Insert - -amplifier- - |
| Column 2, Line 52 | Strike "amplifer"<br>Insert - -amplifier- - |
| Column 2, Line 57 | Strike "amplifer"<br>Insert - -amplifier- - |
| Column 2, Line 60 | Strike "amplifer"<br>Insert - -amplifier- - |
| Column 5, Line 45 | Strike "-" between two and complementary |
| Column 8, Line 8 | Strike "stageduring"<br>Insert - -stage during- - |

UNITED STATES PATENT AND TRADEMARK OFFICE
CERTIFICATE OF CORRECTION

Page 4 of 7

PATENT NO. : 6,023,143
DATED : February 8, 2000
INVENTOR(S) : Salina et al.

Figure 1:
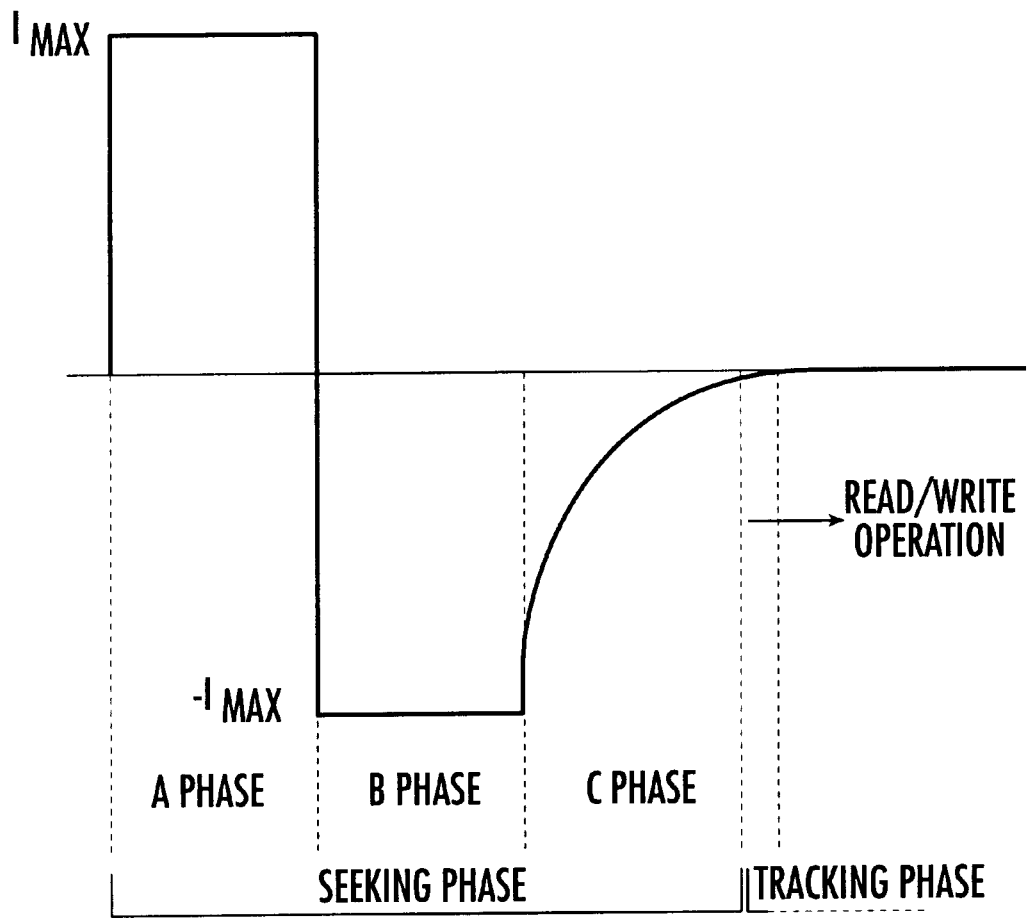
FIG. 1 shows a typical diagram of current absorption by a voice coil motor (VCM), as in the prior art and as discussed above.
Figure 2:
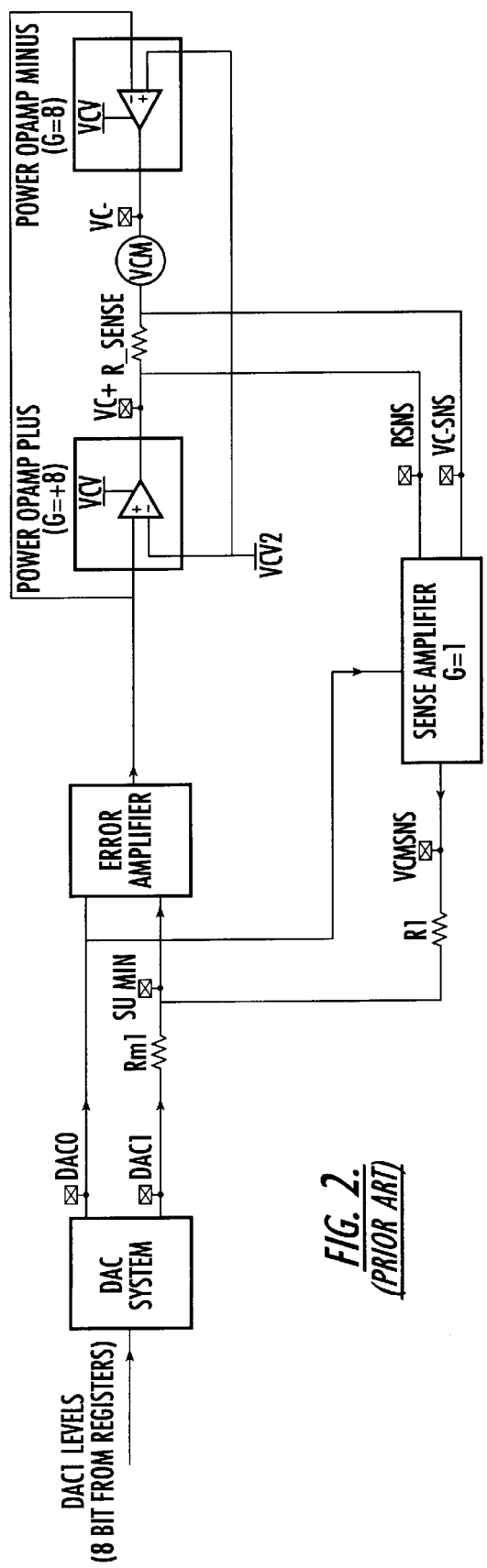
FIG. 2 is a block diagram of a linear mode driving system for a VCM as in the prior art.

It is certified that error appears in the above-identified patent and that said Letters Patent is hereby corrected as shown below:

Figure 2          Strike Figure 2
                  Insert:

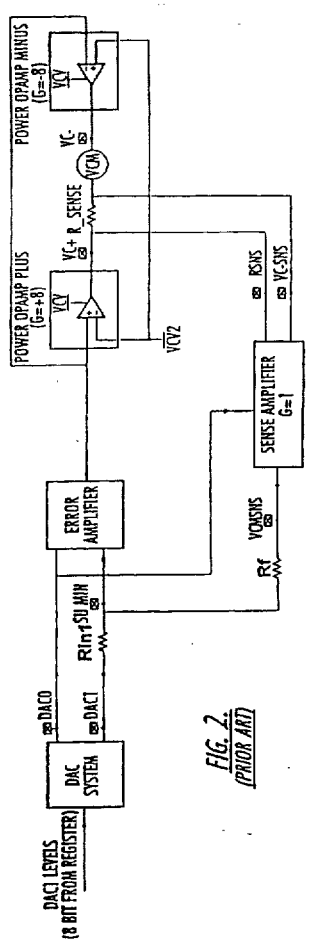

FIG. 2
(PRIOR ART)

UNITED STATES PATENT AND TRADEMARK OFFICE
CERTIFICATE OF CORRECTION

Page 5 of 7

PATENT NO. : 6,023,143
DATED : February 8, 2000
INVENTOR(S) : Salina et al.

Figure 3:
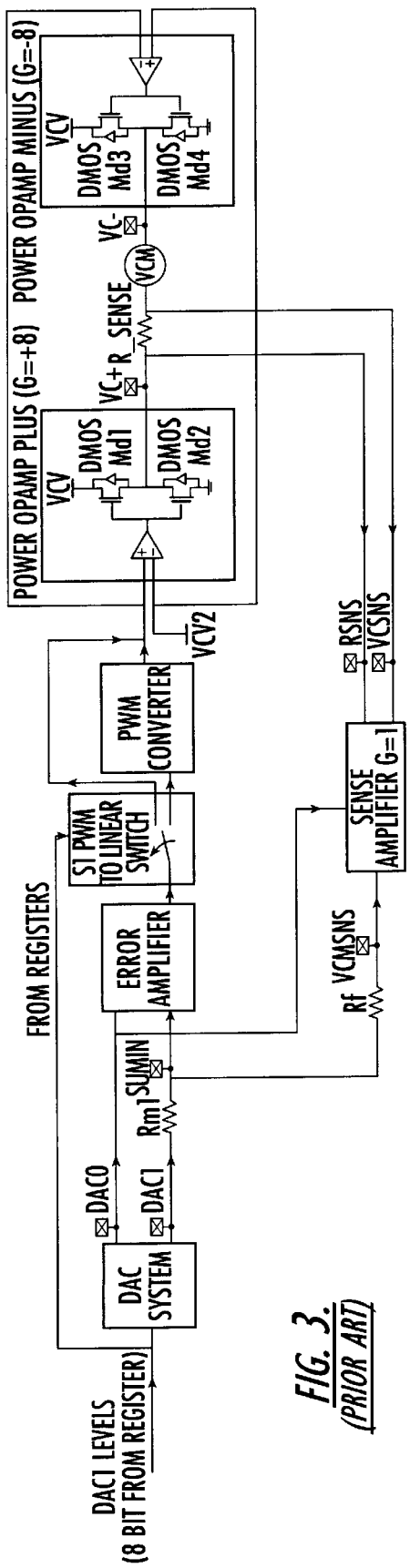
FIG. 3 is a block diagram of a VCM driving system selectably in a PWM or linear mode, according to the prior art.
Figure 4:
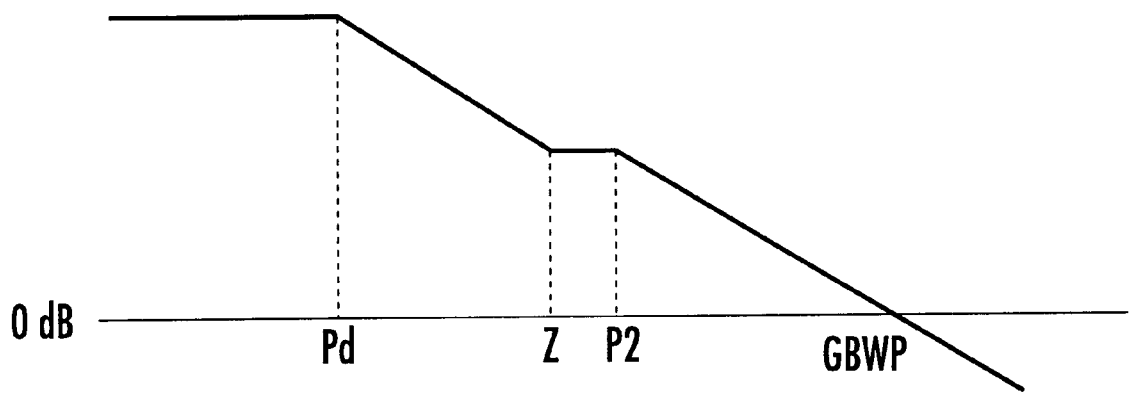
FIG. 4 is a diagram of the open loop response driving system of a VCM in the linear mode as in the prior art.

It is certified that error appears in the above-identified patent and that said Letters Patent is hereby corrected as shown below:

Figure 3          Strike Figure 3
                  Insert:

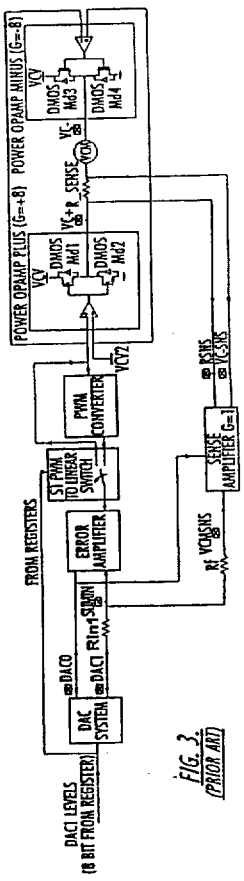

FIG. 3
(PRIOR ART)

UNITED STATES PATENT AND TRADEMARK OFFICE
CERTIFICATE OF CORRECTION

Page 6 of 7

PATENT NO. : 6,023,143
DATED : February 8, 2000
INVENTOR(S) : Salina et al.

It is certified that error appears in the above-identified patent and that said Letters Patent is hereby corrected as shown below:

Figure 5        Strike Figure 5
                Insert:

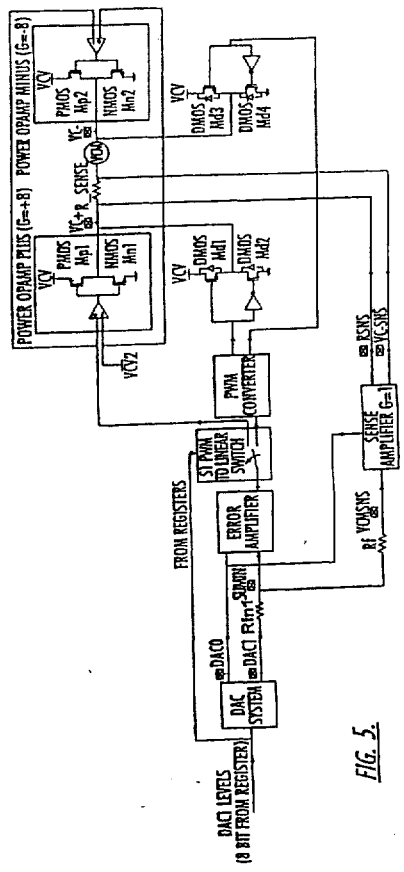

FIG. 5.

UNITED STATES PATENT AND TRADEMARK OFFICE
CERTIFICATE OF CORRECTION

Page 7 of 7

PATENT NO. : 6,023,143
DATED : February 8, 2000
INVENTOR(S) : Salina et al.

It is certified that error appears in the above-identified patent and that said Letters Patent is hereby corrected as shown below:

Figure 6        Strike Figure 6
                Insert:

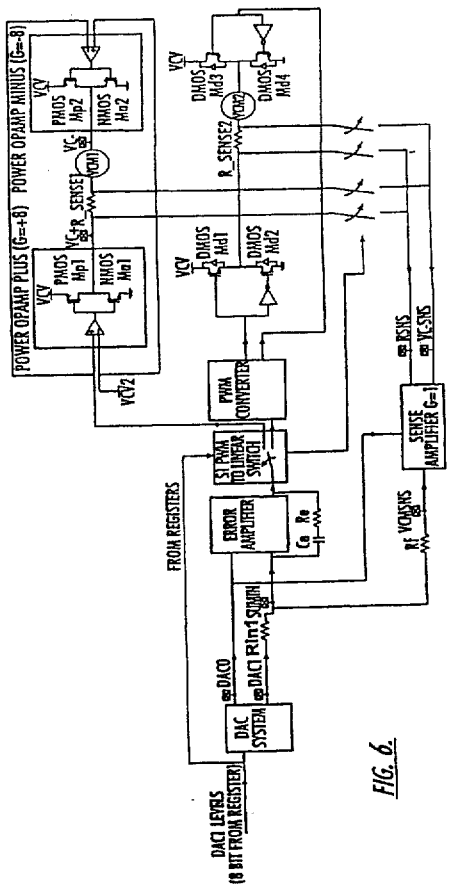

FIG. 6